May 23, 1967 D. R. GRADY 3,321,381
DISTILLATION AND ANALYSIS APPARATUS
Filed Aug. 27, 1963
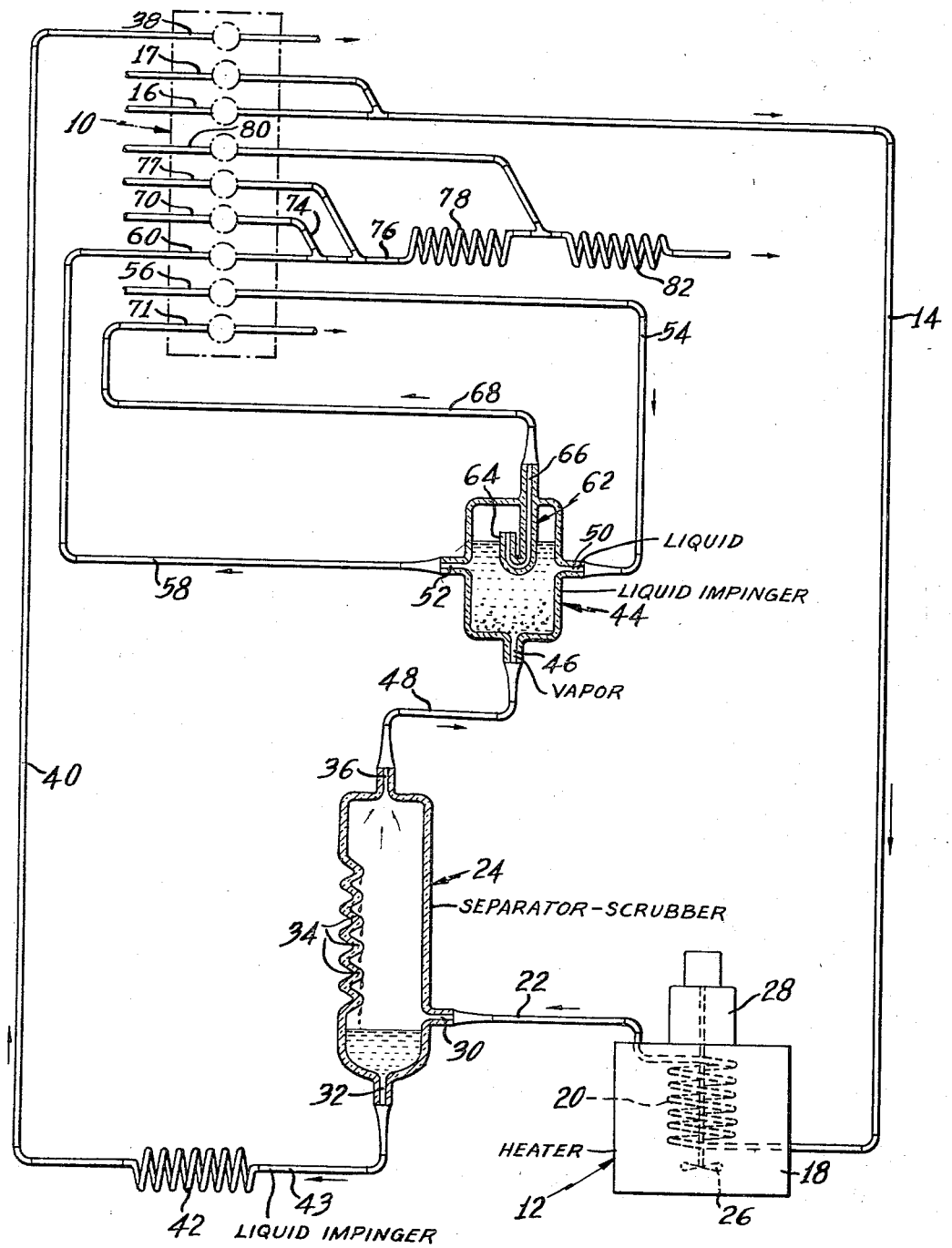
INVENTOR.
DENNIS R. GRADY
BY Harry Cole
ATTORNEY 3,321,381
DISTILLATION AND ANALYSIS APPARATUS
Dennis Robert Grady, Yonkers, N.Y., assignor to Technicon Instruments Corporation, Chauncey, N.Y., a corporation of New York
Filed Aug. 27, 1963, Ser. No. 304,934
4 Claims. (Cl. 202—185)

This invention relates to apparatus for the quantitative determination of a substance which requires distillation either as the only method or as the preferred method of separating such substance from materials which would interfere with the analysis process for the quantitative determination of the substance.

One object of the invention is to provide apparatus which is operable in association with distillation or other liquid heating apparatus to separate the vapor from a liquid-vapor stream which flows from the heating apparatus to said separating apparatus, to prevent physical carry-over of liquid entrained in the vapor, and to introduce the separated vapor into a stream of impinging or other fluid to form a liquid stream containing the substance to be quantitatively analyzed separate from interfering materials.

Another object of the invention is to provide an improved method and apparatus for determining the quantity of a waste substance, ordinarily an industrial waste material, in a liquid stream for pollution study or control.

The above and other objects, features and advantages of this invention will be fully understood from the following description considered in connection with the accompanying drawings which illustrate the presently preferred mode of practicing the invention.

The drawing shows parts of the apparatus in elevation and parts in vertical section and also includes a schematic illustration of a proportioning pump employed in practicing the invention.

According to the invention, briefly described, part of a liquid stream (not shown) which is to be analyzed with respect to a particular substance, for example a waste substance discharged into a stream from a chemical or other manufacturing plant or which may be present in a stream into which the first-mentioned stream flows, is conducted through distillation or other heating apparatus thereby providing a liquid-vapor stream containing said substance in the vapor phase. The liquid-vapor stream is introduced as a continuously flowing stream into a vessel which constitutes a liquid-gas separator and vapor scrubber. From said liquid-gas separator and vapor scrubber vessel the vapor is transmitted as a continuously flowing stream to a vessel or into a chamber at the top of the separator-scrubber vessel wherein the vapor is treated with an impinging or other liquid which is pumped into and out of the chamber so that the liquid stream which flows therefrom contains the substance to be quantitatively analyzed or a reaction product thereof. The present invention may be used in the practice of any method for the determination of various substances in liquid streams, for example for the determination of fluorides, phenols, cyanides, etc. which are some of the more common industrial waste substances which are present in waste streams of chemical or other industrial plants and which may find their way into and pollute liquid streams which are drinking water sources or water for other purposes which should be free of pollution within the recognized standards. Thus it will be understood that the present invention is not concerned with any particular chemistry methodology but on the contrary is not restricted to any particular chemical process for quantitative determinations of the character referred to except that according to the preferred mode of practicing the invention separated substance is treated for colorimetric analysis and is quantitatively analyzed colorimetrically for obtaining the quantitative determination of the substance contained in the stream from which it is removed by in the form of a vapor or distillate as above indicated.

Referring now to the drawings in detail the liquid containing the substance to be analyzed is transmitted by a proportioning pump 10 of a compressible tube type to the distillation or other heating apparatus 12 by way of the tubular conduit 14 which is connected to the outlet end of the compressible pump tube 16. The proportioning pump 10 is in itself well-known and is preferably of the compressible tube type shown and described in U.S. Patent No. 2,935,028 issued to applicant's assignee. Said liquid stream in tube 14 is preferably segmented by air which is introduced into conduit 14 by compressible pump tube 17 to aid in preventing particles of liquid from adhering to the inner wall of tube 16 and the distillation coil hereinafter mentioned. The heating apparatus 12 may be a heating bath which comprises a casing 18 containing a heated liquid in which a helical glass coil 20 of suitable linear length is immersed. The outlet end of tube 14 is connected to the lower end of coil 20 and the outlet or upper end of said coil is connected by a tube 22 to the glass vessel 24 which constitutes the liquid-gas separator and scrubber. The liquid heating apparatus is in itself well-known and it will be understood that any suitable heating means for heating the liquid in which the coil 20 is immersed may be employed. Said heating apparatus is preferably provided with a rotary mixer 26 operated by an electric motor 28 for mixing the heated liquid in the casing of the liquid heating apparatus. Thus it will be noted that the heating apparatus may be a heating bath of a known type preferably of the type sold by assignee of the present application and utilized in the automatic analysis apparatus sold under the trademark "AutoAnalyzer" by said assignee.

The separator-scrubber vessel 24 is provided with an inlet 30 to which the tube 22 is connected for transmission of the liquid-vapor stream from the heating apparatus 12 to said vessel 24, and it will be understood that said liquid-vapor stream is pumped into said vessel and enters said vessel by pressure derived from the pump and the heating of the fluid in the coil of the heating bath. Vessel 24 is provided with a lower outlet 32 for the liquid which separates by gravity from the vapor in the liquid-vapor stream in vessel 24. Said vessel is also provided with a series of baffles 34, in the form of indentations, which act to scrub the vapor so as to remove liquid particles or droplets therefrom before the vapor leaves vessel 24 through its outlet 36 at the upper part of said vessel. The liquid is exhausted from vessel 24 by the operation of the compressible pump tube 38 to which one end of the tubular conduit 40 is connected. The lower end of conduit 40 is connected to the outlet end of a helical glass coil 42 which has its inlet end connected to a tube 43 which is connected to the liquid outlet 32 of vessel 24. Coil 42 provides a damping effect and thereby prevents or reduces surging which may occur in the system when the liquid in coil 20 is at a high temperature for providing the liquid-vapor stream. From tube 38 the liquid is discharged to waste.

The vapor which issues from the vessel 24 through its outlet 36 is treated with an impinging liquid in the vessel or chamber 44 which has a lower inlet 46 connected to the outlet vessel 36 by a tube 48. Chamber 44 may be made as an integral part of vessel 24 with a direct opening for fluid therebetween, tube 48 being omitted. The inlet for the impinging or other liquid is indicated at 50 and the outlet for the liquid containing the distilled substance is indicated at 52. The liquid is pumped into vessel 44 through tube 54 which is connected to the outlet end of compressible pump tube 56, and the liquid is pumped out of vessel 44 through outlet 52 and through tube 58 which is connected to the inlet end of compressible pump tube 60. Chamber 44 is provided with means for controlling the maximum level of liquid therein and for venting the air therefrom. For this purpose said vessel is provided with a tube 62 which has a lower U-part 64, which is open at its upper end, and a vent part 66 which is preferably vented directly to atmosphere but, if desired, may be connected as shown by a tube 68 to the inlet end of the compressible pump tube 71 by which excess liquid and air vented from vessel 44 is conducted to a point of waste disposal. It will be understood that the vapor which bubbles into the liquid in chamber 44 is either dissolved or provides a reaction product therein while the air is removed through vent 62.

The liquid which is discharged from outlet 52 of vessel 44 is treated for colorimetric analysis and for this purpose said liquid may be a color reagent or a color reagent may be added to the liquid which issues from pump tube 60. For the latter purpose the compressible pump tube 72 is connected at its inlet end to a receptacle (not shown) containing such reagent and the outlet end of said pump tube is connected as indicated by the tubular connection 74 to the tube 76 to which pump tube 60 is connected. Tube 76 through which the liquid under analysis and the color reagent flow is connected to the flow cell of a colorimeter (not shown) and, if desired or necessary, said tube 76 may be connected to a heating bath interposed in the fluid line leading to the flow cell of the colorimeter. It will be understood that the operation of the apparatus is continuous in that a flowing stream is transmitted through the heating bath 12, vessel 24, vessel 44 and conduit 76 to the analysis apparatus. The analysis apparatus is preferably of the type shown in U.S. Patent No. 2,797,149 and the manner in which the present apparatus is operated in conjunction with such analysis apparatus will be obvious to those skilled in the art so that further explanation is therefore unnecessary. The liquid stream in conduit 76 is preferably segmented by air introduced by pump tube 77 upstream of the heating bath (not shown) of the analysis apparatus. The air segments are removed from the system at a point downstream of said heating bath and upstream of the flow cell of the colorimeter by air off-take means (not shown) as described in the U.S. Patent application of Leonard T. Skeggs, Ser. No. 828,810, filed July 22, 1959 and assigned to the assignee of this application.

As previously indicated the present invention does not involve any new chemical process. However for the purposes of illustration and for indicating one particular use of the present invention it may be noted that the present apparatus may be used, for example, in performing total cyanide determinations in testing for the pollution of a stream by industrial waste. In acid solution, cyanide forms cyanogen bromide by reaction with bromine water. Cyanogen bromide reacts with benzidine in a dilute pyridine medium to form an intense red color directly proportional to its concentration. Cyanide often exists in metallic complexes such as ferricyanide, zincocyanide, cupricyanide, etc. Under certain conditions, some of these decompose to give free cyanide. Therefore, a digestion-distillation phase is utilized in the analytical system. This stage which is constituted by the heating apparatus 12 converts the metallocyanides into simple cyanides which, upon acidification, form HCN. In the known "AutoAnalyzer" method, the sample liquid is mixed with a 10% solution of magnesium chloride in 9 N hydrochloric acid introduced via a pump tube (not shown) of pump 10 into tube 14 near the point at which the segmentizing air is introduced. The magnesium chloride hastens the conversion of the complex cyanides. The segmented fluid is heated in coil 20 for several minutes at a temperature of 95° C., and the released HCN passes from said coil into separator-scrubber vessel 24 and from the latter to a stream of water flowing through chamber 44 from which said stream containing HCN is pumped by pump tube 60 into tube 76 while a stream of bromine water is introduced by pump tube 72 into tube 76 and mixes in the mixing coil 78 and reacts to form cyanogen bromide. Sodium arsenite is then introduced into the stream of cyanogen bromide by a pump tube 80, and mixes therewith in the mixing coil 82, to remove excess bromine. The stream then flows from coil 82 to a vented reservoir (not shown) where bromine vapor, if present, is vented to atmosphere. After venting, an aliquot stream of the liquid is pumped from said reservoir and mixed with a previously mixed stream of pyridine and benzidine in dilute hydrochloric acid, the stream is then segmentized with air, and the color is developed in a time delay coil of tubing from which the liquid flows past an air take-off to the flow cell of the colorimeter. It will be understood that pump 10 is provided with additional tubes for pumping the liquid from said reservoir, and for pumping streams of pyridine and benzidine through a mixing coil (not shown) into the tube in which said aliquot stream and the segmentizing air are pumped. Said last mentioned tube contains a mixing coil in which the liquid of said aliquot stream is mixed with said previously mixed stream of pyridine and benzidine. In this test, the liquid supplied to chamber 44 by tube 54 may be water in which the HCN is dissolved as the water flows through said chamber.

It will be understood that the invention is not limited to determinations of substances in waste liquids but may be employed generally for determinations of substances which are separable from other substances by distillation. For example and without limitation, the fluoridation of drinking water may be examined or monitored by analyzing a sample stream of fluoridated drinking water in continuous analysis apparatus including the apparatus of the present invention.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. Apparatus for quantitatively analyzing a liquid with respect to a vaporizable substance contained therein wherein said apparatus includes:

a heater for heating a stream of said liquid as it flows therethrough and having an inlet and an outlet;

a gas and liquid separator having an inlet for connecting said separator to said outlet of said heater, having a first outlet for the discharge of liquid from said separator, and having a second outlet for the flow of vapor out of said separator; and chamber means having a first inlet for connecting said chamber means to said second outlet of said separator for the introduction of the vapor, having a second inlet and a first outlet for the flow of a liquid stream therethrough for receiving said vapor into said liquid stream in said chamber means, and having a second outlet above said first outlet for limiting the maximum level of liquid in said chamber means comprising a U-shaped tube having its inlet disposed within said chamber means at the level which is to be established as the maximum level for liquid and its outlet coupled to a pump.

2. Apparatus for quantitatively analyzing a liquid with respect to a vaporizable substance contained therein wherein said apparatus includes:

a heater for heating a stream of liquid as it flows therethrough and having an inlet and an outlet;

a gas and liquid separator having an inlet for connecting said separator to said outlet of said heater, having a first outlet for the discharge of liquid from said separator, and having a second outlet for the flow of vapor out of said separator;

chamber means having a first inlet for connecting said chamber means to said second outlet of said separator for the introduction of the vapor, having a second inlet and a first outlet for the flow of a liquid stream therethrough for receiving said vapor into said liquid stream in said chamber means, and having a second outlet above said first outlet for limiting the maximum level of liquid in said chamber means comprising a U-shaped tube having its inlet disposed within said chamber means at the level which is to be established as the maximum level for liquid; and means for pumping said first mentioned liquid through said heater, for pumping liquid out of said separator, for pumping said second mentioned liquid into said second inlet and out of said first outlet of said chamber means, and for pumping excess liquid from said chamber means through the outlet of said U-shaped tube.

3. Apparatus for quantitatively analyzing a liquid with respect to a vaporizable substance contained therein wherein said apparatus includes:

a heater for heating a stream of liquid as it flows therethrough and having an inlet and an outlet;

a gas and liquid separator having an inlet for connecting said separator to said outlet of said heater, having a first outlet for the discharge of liquid from said separator and having a second outlet for the flow of vapor out of said separator;

scrubber means disposed within said separator in the path of flow of the vapor for removing liquid particles from the vapor before the vapor flows out of said separator;

chamber means having a first inlet for connecting said chamber means to said second outlet of said separator for the introduction of the vapor, having a second inlet and a first outlet for the flow of a liquid stream therethrough for receiving said vapor into said liquid stream in said chamber means, and having a second outlet above said first outlet for limiting the maximum level of liquid in said chamber means comprising a U-shaped tube having its inlet disposed within said chamber means at the level which is to be established as the maximum level for liquid and its outlet coupled to a pump.

4. Apparatus for quantitatively analyzing a liquid with respect to a vaporizable substance contained therein wherein said apparatus includes:

a heater for heating a stream of liquid as it flows therethrough and having an inlet and an outlet;

a gas and liquid separator having an inlet for connecting said separator to said outlet of said heater, having a first outlet for the discharge of liquid from said separator and having a second outlet for the flow of vapor out of said separator;

scrubber means disposed within said separator in the path of flow of the vapor for removing liquid particles from the vapor before the vapor flows out of said separator; and chamber means having a first inlet for connecting said chamber means to said second outlet of said separator for the introduction of the vapor, having a second inlet and a first outlet for the flow of a liquid stream therethrough for receiving said vapor into said liquid stream in said chamber means, and having a second outlet above said first outlet for limiting the maximum level of liquid in said chamber, which second outlet is disposed within said chamber means and comprises a tube having its inlet at the level which is to be established as the maximum level for the liquid and pump means connected to said tube inlet.

References Cited by the Examiner
UNITED STATES PATENTS

| | | | |
|---|---|---|---|
| 88,434 | 3/1869 | Bannister | 202—199 X |
| 1,307,184 | 6/1919 | Chenard | 202—199 |
| 2,329,863 | 9/1943 | Thomas | 62—496 X |
| 2,368,493 | 1/1945 | Reistad | 62—496 X |
| 3,065,148 | 11/1962 | Ferrari | 23—230 |
| 3,097,927 | 7/1963 | Skeggs | 23—230 |
| 3,116,754 | 1/1964 | Ferrari | 23—253 |
| 3,169,912 | 2/1965 | Ferrari et al. | 202—238 |

NORMAN YUDKOFF, *Primary Examiner.*

F. E. DRUMMOND, *Assistant Examiner.*